March 10, 1953 — A. G. GRANATH — 2,630,608
MOLDING DRUM
Filed June 17, 1950 — 3 Sheets-Sheet 1
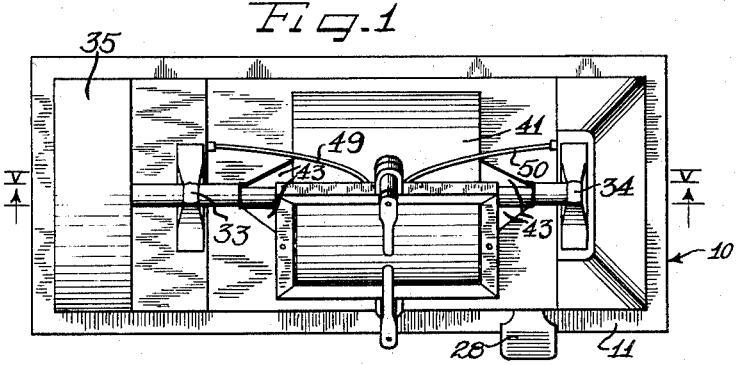
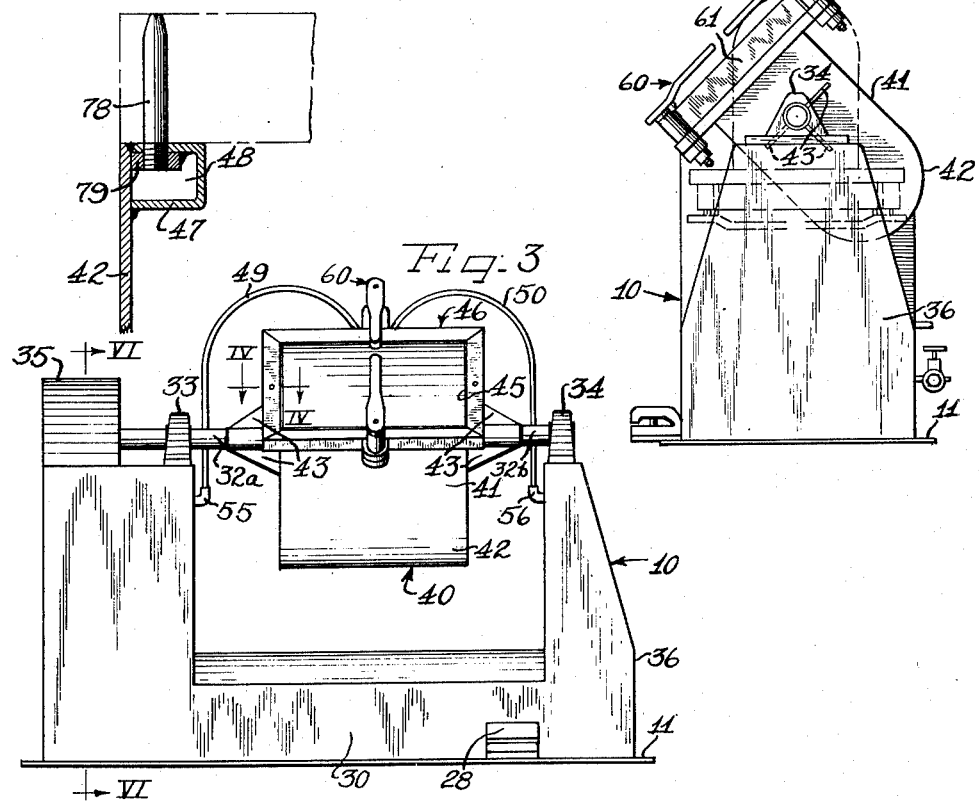
Inventor
Axel G. Granath March 10, 1953 A. G. GRANATH 2,630,608
MOLDING DRUM
Filed June 17, 1950 3 Sheets-Sheet 2
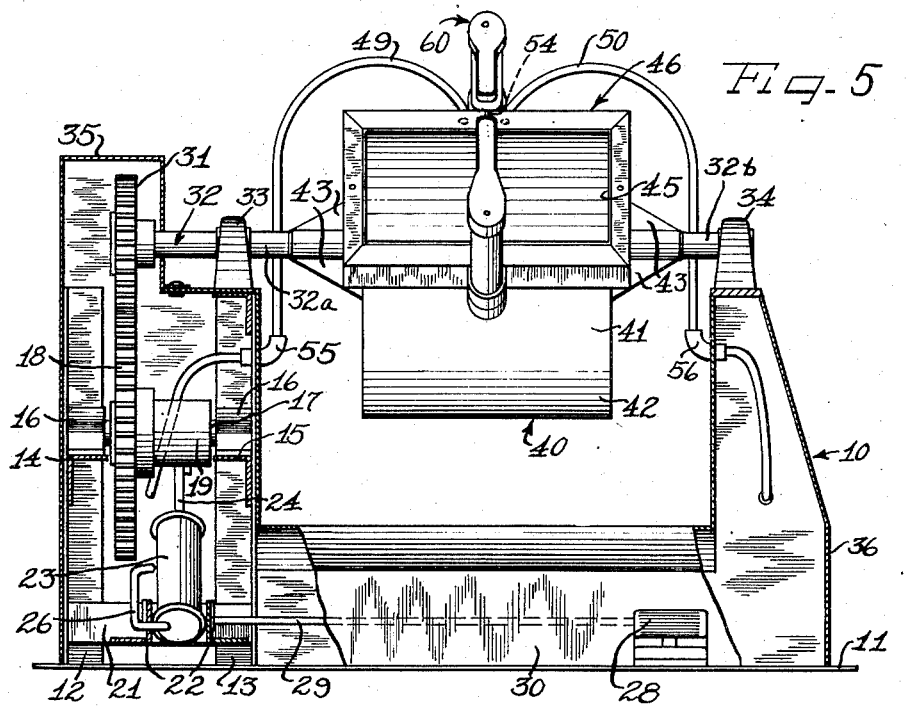
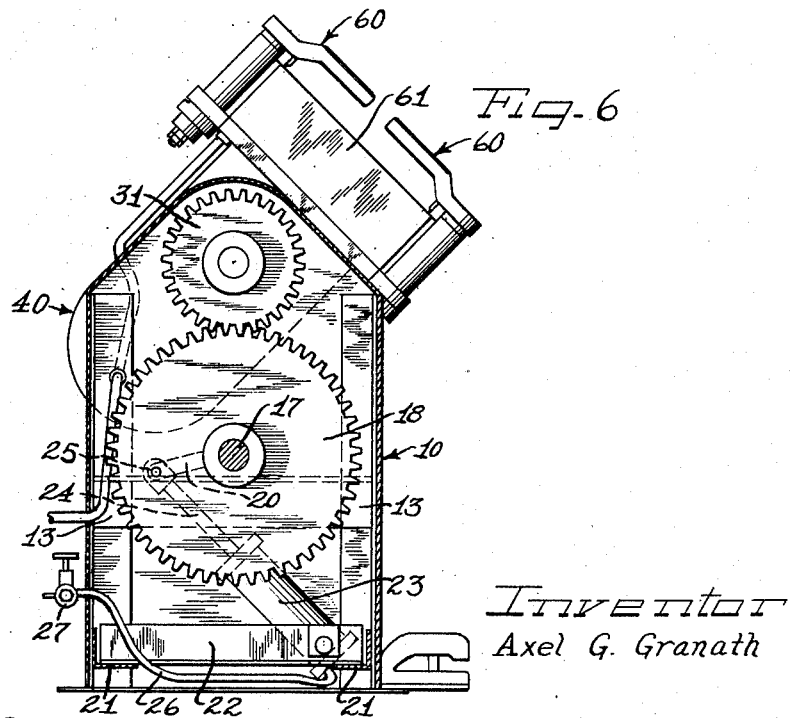
Inventor
Axel G. Granath
by The Firm of Charles A. Wills Attys

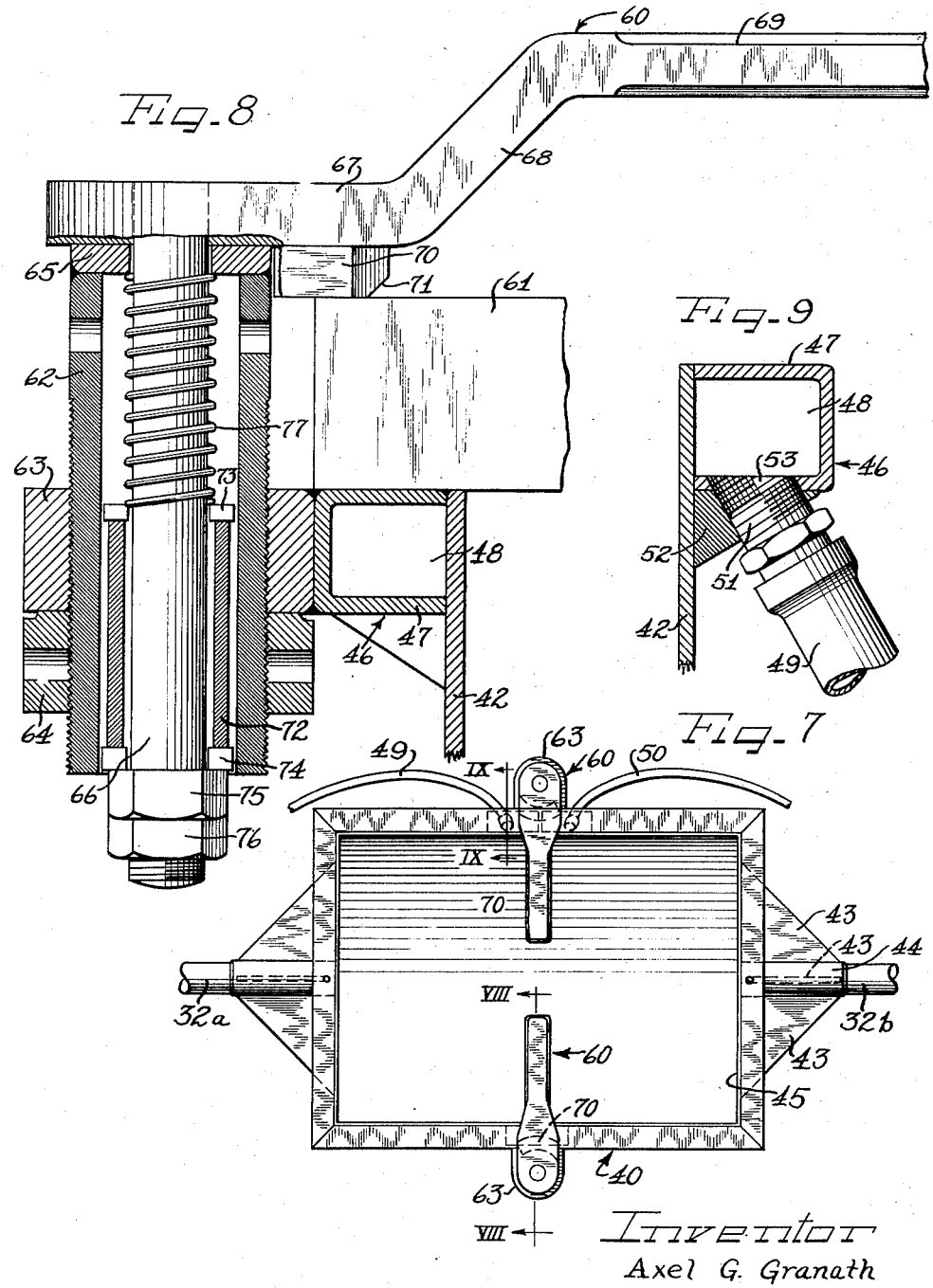

Patented Mar. 10, 1953

2,630,608

UNITED STATES PATENT OFFICE 2,630,608

MOLDING DRUM

Axel G. Granath, Chicago, Ill., assignor, by mesne assignments, to Herbert Simpson Corporation, Chicago, Ill., a corporation of Illinois Application June 17, 1950, Serial No. 168,756

3 Claims. (Cl. 22—9)

The present invention relates to a molding drum and more particularly to an invertible molding drum for the preparation of molds for subsequent employment in the casting of metals and alloys.

Recently there has been developed a process for the casting of metals in a mold formed of resin-bonded sand. This process employs a mold which is prepared from a blend of fine sand and a pulverized mixture of resin-forming ingredients. In the course of the process, these ingredients react to form a synthetic resin, such as a phenol-formaldehyde resin. The mold or half mold is prepared by covering a heated metal pattern with the resin-sand composition, allowing the resin to soften and fuse, thus forming a continuous coating over the surface of the pattern. Subsequently, the half mold while still on the pattern, is reheated to completely cure the resin component. The half mold is then removed from the pattern and two such half molds secured together are placed in a box and backed with steel shot, or other suitable bedding material, which supports the relatively thin mold parts so that they will withstand the pressure of molten metal subsequently introduced into the mold. The liquid metal is then poured into the mold in the usual manner. Solidification occurs as the evolved gases escape through the gas permeable mold.

The present invention relates to an improved apparatus for making such half molds. More particularly, the present invention includes an invertible drum, or hopper, having one open side and adapted to contain a quantity of resin-forming ingredients admixed with sand. Means are provided for clamping a metal pattern plate against the open side of the drum to close the same, with the pattern facing the interior of the drum. The drum is pivotally mounted for inversion about a horizontal axis, so that the contents of the drum can be dumped onto the pattern.

The pattern plate is heated prior to its being secured to the molding drum, and the present invention preferably provides a water jacket on the molding drum immediately adjacent the pattern plate to keep those portions of the drum immediately adjacent the pattern plate cool, so that the resin in the mixture will not soften and fuse on these portions of the drum. After the mold has been formed on the pattern plate, the drum is re-inverted. The pattern plate is removed for subsequent heat treatment to harden the mold thereon.

It is, therefore, an important object of the present invention to provide an improved apparatus for the preparation of resin-bonded molds and mold parts.

Another important object of the present invention is to provide an improved mold-forming apparatus including an invertible drum for containing sand and resin-forming ingredients and for introducing the same onto a pattern plate to form a half mold thereon.

It is a further important object of the present invention to provide a pivoted drum adapted to receive thereon a heated pattern plate and to retain therein a mold-forming composition, the drum being invertible to introduce the composition onto the pattern plate and being provided with cooling means adjacent the pattern plate for preventing the fusion of the composition against parts of the drum itself.

It is still another important object of the present invention to provide a drum mounted for pivoting movement from a susbtantially upright position to an inverted position, the drum being provided with cooling means immediately contiguous to an open side thereof and the drum having clamping means for securing a pattern plate to the open drum side after a mold-forming composition has been charged into the drum.

Other and further important objects of the present invention will be apparent from the disclosures in the specification and the accompanying drawings.

On the drawings:

Figure 1 is a plan view of a drum of the present invention;

Figure 2 is a side elevational view of the drum of Figure 1 having a pattern plate secured thereto and showing the drum in substantially upright position in full outline and in inverted position in dotted outline;

Figure 3 is a front elevational view of the drum of Figure 1;

Figure 4 is a sectional view, with parts shown in elevation, taken along the plane IV—IV of Figure 3;

Figure 5 is an enlarged sectional view, with parts shown in elevation, taken along the plane V—V of Figure 1;

Figure 6 is an enlarged sectional view, with parts shown in elevation, taken along the plane VI—VI of Figure 3;

Figure 7 is an enlarged fragmentary plan view of the drum alone;

Figure 8 is an enlarged fragmentary sectional view taken along the plane VIII—VIII of Figure 7; and Figure 9 is an enlarged sectional view taken along the plane IX—IX of Figure 7.

As shown on the drawings:

As shown in Figures 1 and 5, reference numeral 10 refers generally to a drum assembly of the present invention including a drum-supporting structure comprising a floor plate 11 and pairs of corresponding upstanding angle iron supports 12 and 13. Horizontally extending angle iron supports 14 and 15, joining said pair of supports 12 and 13, serve to support pillow block bearings 16 in which is journalled a shaft 17. The shaft 17 has keyed thereto a gear 18 having an axially extending gear boss 19, from which a radially extending arm 20 (Fig. 6) rigidly projects.

The spaced pairs of supports 12 and 13 (Figs. 5 and 6) also carry lower transversely extending support members 21 and longitudinal support members 22 between which is mounted a fluid pressure or pneumatic cylinder 23 for pivotal movement in a vertical plane. The cylinder 23 is provided with an actuating rod 24 projecting therebeyond and pivotally secured, as at 25, to the arm 20 projecting from the gear block 19.

The pneumatic cylinder 23 communicates with a source of fluid, such as air under pressure through line 26 controlled by a hand-operated valve 27. It will be seen that reciprocation of the actuating rod 24 of the pneumatic cylinder 23 will cause corresponding movement of the arm 20 and corresponding pivoted movement of the shaft 17 and the gear 18 carried thereby. Actuation of cylinder 23 is controlled by a bleed valve treadle 28 spaced from the cylinder 23 and communicating therewith through a fluid pressure bleed line 29. Preferably, the bleed valve treadle 28 is conveniently located exteriorly of a casing section 30 which encloses the bleed valve itself, as well as the bleed line 29.

The gear 18 meshes with a superimposed gear 31 which is keyed to or otherwise fixedly secured to a shaft 32 which is journaled and supported in spaced pillow block bearings 33 and 34. The bearing 33 is directly supported by one of the upright support members 13, the bearing surmounting a housing 35, enclosing the support members 12—13, 14—15, and 21—22, the gearing, and pneumatic cylinder elements carried thereby. The bearing 34 is carried by an upstanding post 36 generally comprising a sheet metal housing supported from the floor 11.

As best illustrated in Figures 5 and 7, the shaft 32 actually comprises a pair of stub-shafts 32a and 32b passing through the bearings 33 and 34, respectively, and each secured to a drum 40 overlying the housing section 30 and interposed between the housing sections 35 and 36. More particularly, the drum 40 is formed with generally rectangular side walls 41 and an integral arcuate bottom wall 42. The open topped drum 40 is secured to the stub-shafts 32a and 32b by means of triangular reinforcing webs 43 secured to a collar 44 telescoped over and secured to the terminal end of each of the stub-shafts and to opposing side walls 41 of the drum.

The drum 40 is provided with an open end 45 opposing the arcuate bottom 42 thereof and surrounded by a coolant jacket 46 (Fig. 8) defined by a U-shaped channel member 47 having an open side abutting the side walls 42 immediately adjacent the opening 45 and secured thereto by suitable means, as by welding. The channel member 47, in cooperation with the side walls 42, thus defines a closed interior coolant conduit 48 extending about the entire perimeter of the open side 45 of the drum.

The conduit 48 communicates with an inlet conduit 49 and an outlet conduit 50 midway of one of the long sides of the drum 40. As shown in detail in Figure 9, each of the conduits 49 and 50 is provided with a terminal externally threaded adapter 51 threadedly retained by a generally triangular supporting block 52 underlying and secured to the channel member 47 and communicating with a threaded aperture 53 formed in the undersurface of the channel member 47.

As shown in Figure 5, a transversely extending wall 54 separates the inlet conduit 49 and the outlet conduit 50, so that fluid introduced into the conduit 48 through the line 49 must pass completely about the perimeter of the drum 40 before its exit through the line 50. The line 49 is provided with an intermediate adapter 55 extending through an upstanding wall of the housing 35 and through the interior of the housing for communication with a source of coolant liquid, such as water, under pressure. Similarly, the conduit 50 passes through an adapter 56 in the housing 36 for communication with a coolant outlet.

Clamping means 60 are provided midway of the longer sides of the rectangular molding drum 40 for securing a pattern plate 61 to the open end of the molding drum. The clamping means, as best illustrated in Figure 8, include an externally threaded cylindrical sleeve 62 threaded into a support block 63 welded or otherwise secured to the vertical leg of the channel member 47, and internally threaded to receive the sleeve 62. A nut 64 is threaded onto the sleeve 62 and is bottomed against a support member 63 to position the member 62 vertically to project to the desired distance above the support block 63. The sleeve 62 is substantially closed at its upper end by means of a centrally apertured plate 65 welded to the sleeve 62.

A stem 66 extends axially through the sleeve 62 and through the central apertures of the member 65 to carry at its upper end a handle 67 secured to the stem by suitable means and having an upwardly offset portion 68 and a terminal actuating portion 69. A cam block 70 having a lower camming surface 71 is carried by the handle portion 67 to abut the upper surface of the pattern plate 61.

The stem 66 at its lower portion is surrounded by a collar 72 bearing at the axial ends against upper and lower washers 73 and 74, respectively. The lower washer 74 is vertically adjustable by means of a nut 75 and a lock nut 76 secured to the threaded end of the stem 66, while the upper washer 73 abuts the lower extremity of a helical compression spring 77 confined between the washer 73 and the plate 65 overlying the sleeve 62. It will be seen that the helical spring 77 urges the stem 66, and the handle 67 carried thereby, downwardly within the sleeve 62 and the cam block 70 is correspondingly urged against the pattern plate 61. The compression strength of the spring and, consequently, the pressure exerted on the pattern plate 61 may be adjusted, first, by threaded adjustment of the nuts 75 and 76 on the stem 66 and, secondly, by adjustment of the threaded sleeve 62 within the support block 63, thereby accommodating various thicknesses of pattern plate 61 and/or various compression forces desired to be exerted on the pattern plate 61.

As illustrated in Figure 4, the pattern plate is indexed into position on the drum by means of upstanding guide pins 78 threadedly retained within blocks 79 disposed within the water jacket 47. The pins 78 are adapted to extend into corresponding apertures in the pattern plate.

The operation of the device hereinbefore described is substantially as follows:

The molding drum 40 is charged with the desired mixture of resin-forming ingredients and sand in dry pulverulent form, while the molding drum is in the upright full line position illustrated in Figures 1-3, 5 and 6. A satisfactory mixture is:

| | Per cent |
|---|---|
| Silica sand | 92–94 |
| Resin-forming ingredients composed of 90% phenolic resin (A or B stage) 10% hexamethylene tetramine | 8– 6 |

The mixture of the resin-forming ingredients to form the binder is prepared by grinding the same together until the mixture passes a 100-mesh screen.

Next, a preheated pattern plate 61, heated to around 200° C. and having a mold lubricant such as paraffin on its pattern face, is positioned over the drum with the guide apertures of the plate registering with and receiving the guide pins 78. The preheated pattern plate is secured in position by the clamping means 60, with the camming block 70 resiliently securing the pattern plate in position under the compression stress of the spring 77. Coolant fluid, preferably water, is introduced into the coolant passage 48 through the inlet line 49, with the heated fluid being removed through the outline 50.

Next, the bleed valve treadle is actuated by the operator to bleed fluid under pressure from the actuating cylinder 23. The overbalanced condition of the drum in its normal position causes rotation of the stub-shafts 32a and 32b within their bearings with consequent co-rotation of the gears 18 and 31 to invert the molding drum to the position shown in dotted outline in Figure 2. When the drum is in this inverted position, the mixture of phenol-formaldehyde resin and sand within the drum will, under the influence of gravity, fall against and cover the heated pattern surface of the pattern plate 61. Upon contact with the heated pattern plate, the resin softens and adjusts itself to the contours of the pattern surface to form a uniform film thereon. The cooling of the adjacent portion of the molding drum 40 by the cooling jacket 46 prevents the melting and possible bonding of the resin to these relatively cool portions of the molding drum.

After a sufficient time has elapsed to insure the presence of a uniform film of the desired thickness of resin and sand upon the pattern surface, the mold is reinverted to its original position by release of the bleed valve treadle. This permits actuation of the cylinder 23 by the source of fluid under pressure causing the rod 24 to move into its extended position illustrated in Figure 6, with coincident rotation of the gears 18 and 31.

Following the substantially upright positioning of the drum, the clamping means 60 are released and the pattern plate bearing the half mold may be removed for baking and/or curing the resin in the half mold thereon.

Since only a small portion of the charge sticks to the hot pattern plate during each operation, a single charge may be used in making a large number of half molds. The resin-sand mixture not adhering to the pattern plate drops back into the bottom of the drum each time the drum is brought back to its normal, or upright, position.

It will be understood that modifications and variations may be effected without departing from the scope of the novel concepts of the present invention.

I claim as my invention:

1. In apparatus for dumping mold-forming ingredients against a pattern plate, a plurality of side walls and an end wall cooperating to define a drum having an interior space and an open top, a U-shaped channel member having its open side abutting and secured to said side walls and cooperating therewith to define a water jacket surrounding the open top of said drum, said jacket having a surface flush with and forming a lateral extension of said side walls, opposing resiliently urged manually actuatable clamping means carried by opposing portions of said water jacket and adapted to clamp said pattern plate against said water jacket in effective heat transfer relation therewith, and guide pins carried by said cooling jacket and projecting therebeyond for indexing the position of said pattern plate relative thereto.

2. In apparatus for dumping mold-forming ingredients against a heated pattern plate, a drum having side walls, an arcuate bottom wall, and an open side opposing said bottom wall, a U-shaped channel member extending about the perimeter of said open side and cooperating with said side walls to form a cooling jacket immediately adjacent the open end of said drum, and means for clamping a pattern plate against said cooling jacket and said drum, said cooling jacket preventing the heating of those portions of said drum side walls contacting said pattern plate.

3. In an apparatus for dumping mold-forming ingredients onto a pattern plate, a pair of spaced uprights, a shaft journaled in said uprights for movement about a horizontal axis, a drum comprising a plurality of side walls and an end wall and having an interior space and an open top, a U-shaped channel member having its open side abutting and secured to said side walls and cooperating therewith to define a water jacket surrounding the open top of said drum, said jacket having a surface flush with and forming a lateral extension of said side walls, opposing resiliently urged manually actuatable clamping means carried by said opposing portions of said water jacket and adapted to clamp said pattern plate against said water jacket in effective heat transfer relation therewith, said drum being carried by said shaft for movement therewith to an overbalanced position inclined to the vertical and to an inverted position, gearing for effecting pivotal movement of said shaft and the drum carried thereby, and power-operated means for actuating said gearing, said last mentioned means including a source of fluid under pressure, a cylinder communicating with said source of fluid under pressure, a piston disposed within said cylinder and movable therein under the influence of fluid pressure therein to retain said drum in said overbalanced position, and a manually operable bleeder valve for bleeding fluid pressure from said cylinder to thereby move said piston to an adjusted position, thereby actuating said gearing to pivot said drum to an inverted position.

AXEL G. GRANATH.

(References on following page)

REFERENCES CITED

The following references are of record in the file of this patent:

UNITED STATES PATENTS

| Number | Name | Date |
|---|---|---|
| 1,004,602 | Stoney | Oct. 3, 1911 |
| 1,321,517 | Frederick | Nov. 11, 1919 |
| 1,456,319 | Lewis | May 22, 1923 |
| 1,638,665 | Lewis | Aug. 9, 1927 |
| 1,961,213 | Guyot | June 5, 1934 |
| 2,191,882 | Ernest | Feb. 27, 1940 |
| 2,459,205 | Wells et al. | Jan. 18, 1949 |

FOREIGN PATENTS

| Number | Country | Date |
|---|---|---|
| 614,205 | Great Britain | Dec. 10, 1948 |

OTHER REFERENCES

Molds from Durez Resin and Sand, 3 pages, May 19, 1950.

Metal Industry, December 19, 1947, page 506.